June 21, 1949.  D. E. SUNSTEIN  2,474,074
APPARATUS FOR CONTINUOUSLY PREDICTING
TRENDS IN OBSERVED DATA
Filed April 28, 1945  3 Sheets-Sheet 1
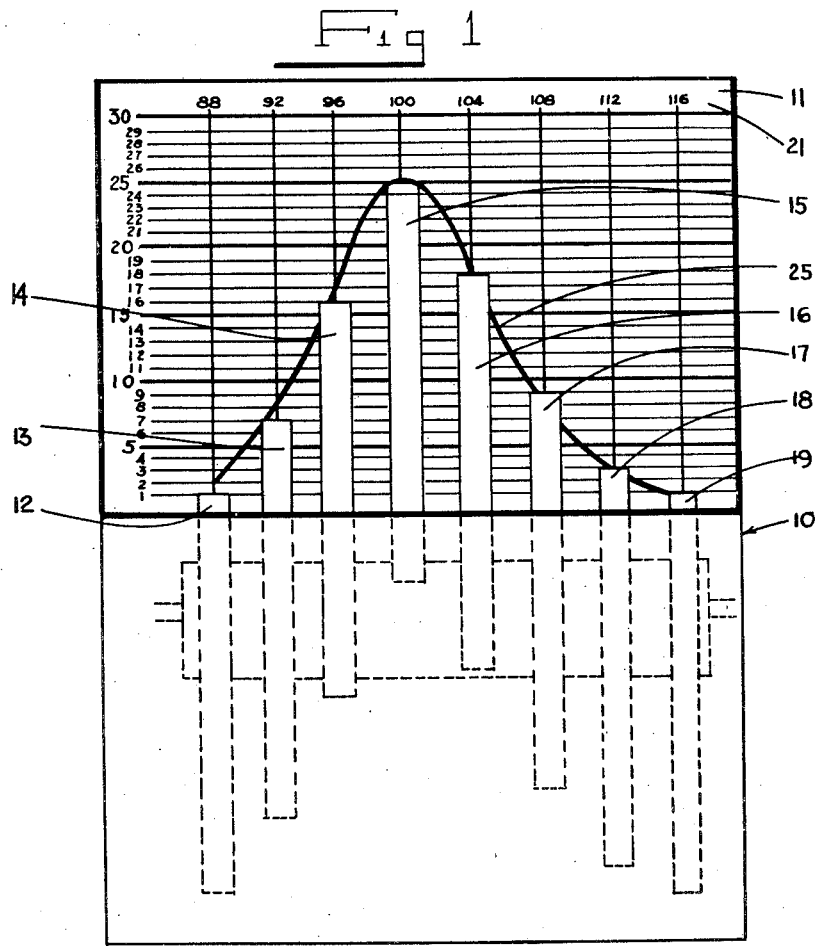
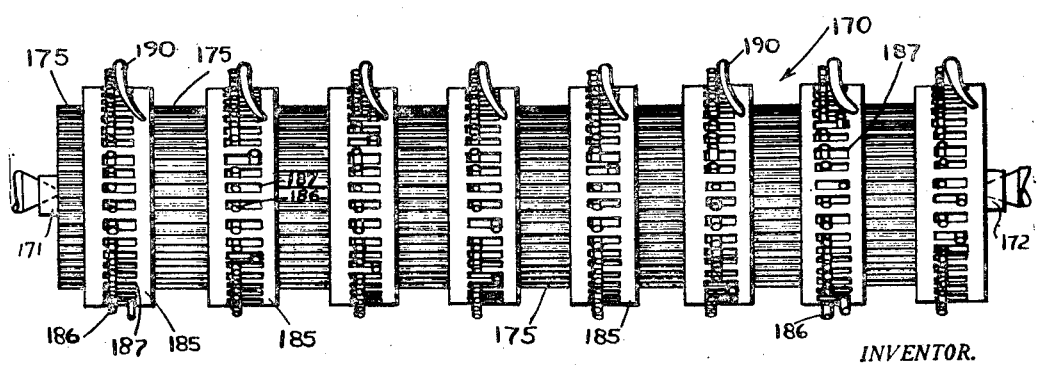
INVENTOR.
DAVID E. SUNSTEIN
BY Ostrolenk + Faber
ATTORNEYS June 21, 1949.  D. E. SUNSTEIN  2,474,074
APPARATUS FOR CONTINUOUSLY PREDICTING
TRENDS IN OBSERVED DATA Filed April 28, 1945  3 Sheets-Sheet 2

INVENTOR.
DAVID E. SUNSTEIN
BY Ostrolenk & Faber
ATTORNEYS

Patented June 21, 1949

2,474,074

UNITED STATES PATENT OFFICE 2,474,074

APPARATUS FOR CONTINUOUSLY PREDICTING TRENDS IN OBSERVED DATA

David E. Sunstein, Elkins Park, Pa., assignor to Philco Corporation, a corporation of Pennsylvania Application April 28, 1945, Serial No. 590,811

8 Claims. (Cl. 177—311)

My invention relates to the method of and means for indicating the trend of values of devices during the process of manufacture thereof, and more specifically relates to apparatus and methods for continuously and visually producing a constantly changing curve showing at any instant the distribution of the values of a predetermined number of devices made just prior to that instant.

In production testing any manufactured article, it is desirable in order that the quality of the manufactured product may be controlled to know during the manufacturing operations the distribution curve resulting from any given test imposed on the manufactured article. Thus, for example, in the manufacture of resistors, test data on the resistance values of sample lots of resistors are made. If the resistance value of the resistors deviates beyond predetermined limits, corrections should be made in the manufacturing process in order to bring the resistance values of further resistors manufactured within the prescribed limits.

Methods of effecting such control has been the subject of extensive investigation but heretofore no commercially satisfactory arrangement has been devised due to a number of factors. For one thing, the indications provided by any one batch of resistors may be misleading unless it is related to test results preceding and following such test results. Thus, for example, if in the manufacture of resistors whose desired resistance is 100 ohms, the resistors deviate within a permissible value on either side of this value, the resistors are acceptable. Moreover, deviations beyond this permissible value are to be expected for a reasonable percentage of the manufactured resistors. If these conditions obtain, no change in manufacturing process should be made notwithstanding the fact that some resistors may have values outside the permissible deviations.

It is accordingly desirable that the manufacturing control shall be in accordance with the test results which continuously show an overall picture of the manufacturing process.

A further factor in manufacturing control is the time element. Test data used in manufacturing control must be of the latest devices made since otherwise controls opposite in nature from those which should be made may be effected due to changes which have occurred in the manufacturing process since the last test. Thus if the latest tested resistors mentioned above indicate values which are too high and if this fact is noted only after a change has occurred in the manufacturing process so that resistors coming off the production line are too low, a further correction toward lower value will be disastrous to production.

Statistical methods heretofore employed have had both the defects that they did not correlate results of a number of units and that the recording and relaying of such information to the production department had a time lag which rendered the data secured relatively untrustworthy for production control.

Accordingly a primary object of my invention is to provide novel apparatus for and methods for automatically analyzing and indicating (preferably graphically) at any instant the distribution of values of a predetermined number of devices manufactured just prior to that instant.

Another object of my invention is the provision of novel apparatus for and methods for automatically and graphically indicating on a curve the distribution at any instant of resistance values of a predetermined number of resistors tested just prior to that instant.

When such instantaneous indication is obtained at any moment for a predetermined number of devices made just before that moment, it becomes possible for the test operator himself readily to determine the degree to which the distribution of the devices tested fits within the desired test limits. Therefore the operator can instantaneously obtain accurate information to communicate to the operator of the apparatus which fabricates the devices to enable him to make an immediate adjustment.

By this means therefore, production difficulties can be corrected before they are actually of sufficient magnitude to cause rejections. Indeed the tendency of the distribution of the devices along the curve, for the particular characteristic tested, to shift away from a centrally positioned distribution curve toward either a high or low limit can be foreseen before a significant quantity of units is rejected.

Automatic and instantaneous control is therefore made possible to analyze and instanteously control this trend and thereby to restore the distrubtion of the articles and their curve so that it is properly centered with respect to the tolerances. In fact, the control of the manufacturing operations can, by the system and apparatus of my invention, be automatically achieved. The average value of the distribution can be automatically measured and the result of this measurement can automatically be used to control the apparatus fabricating the device under test in the proper direction so as to restore the distribution curve to its proper value.

As pointed out above, in the manufacture of devices of the general character described, it is sometimes not alone sufficient that these devices classify generally in a proper manner over a distribution curve, but also that the specific number of devices for any individual group within the predetermined number so distributed should not exceed a certain number. Thus, for instance, my novel system and apparatus provides an indication at any instant of the distribution of the last 80 resistors or other devices made just prior to that instant. For example, where the resistor is to have a resistance of 100 ohms, a distribution curve may be: 2 resistors at 88 ohms; 8 at 92 ohms; 17 at 96 ohms; 25 at 100 ohms; 17 at 104 ohms; 8 at 108 ohms; 2 at 112 ohms; and 1 at 116 ohms (all the grades being plus or minus 2 ohms).

In the case of a distribution of this type where the number of resistors within the 100 ohm classification increases substantially beyond the curve thus indicated, the result is satisfactory, possibly indicating, however, unnecessarily narrow limits of tolerance earlier in the process. Where, however, even though the distribution curve is generally maintained, the number of resistors testing at 104 ohms increases to a substantial degree, say beyond 20, for the last batch of 80, then even though the distribution curve may generally be bell-shaped, instantaneous means should exist for immediately indicating the fact that a relatively large number of resistors is being made which varies in one direction from the optimum.

Accordingly, another object of my invention is the provision of means in connection with the indicating and testing system above described, for creating an aural or visual alarm or a combination of both when the number of devices for a specific classification within the distribution curve exceeds a maximum limit. Again the indication here given may be one which automatically stops the manufacturing operation or which automatically adjusts the manufacturing operation in accordance with the excessive variation thus indicated.

A part of my invention resides in obtaining a distribution curve which gives at any instant the distribution of a particular characteristic of a predetermined number of devices, the devices having been made and tested just prior to that particular instant.

Another object of my invention therefore, is the arrangement of a system and apparatus whereby after the predetermined number of devices have been made and tested, the making and testing of an additional device and the adding of the test result thereof to the distribution curve will result in simultaneous subtraction from the distribution curve of the test result of the earliest device made, i. e., just prior to the predetermined number which includes the latest device. By this means therefor, the distribution curve is constantly changing, always showing test results of a predetermined number N (such as 80) of devices made and always giving an immediate and clear picture of the distribution.

Where it is desired to determine a trend, that is, the direction of shift in the distribution curve, it is only necessary to watch the distribution curve as a number of devices are made and determine the direction in which the constantly changing curve shifts.

Recording means may also be provided in connection with my novel system to record the distribution curve from instant to instant and thus provide a graphic illustration not merely of the distribution curve at any instant but of the degree and direction of shift of the distribution curve.

Accordingly, still another object of my invention is the provision of means for determining at any instant the test result distribution of a predetermined number of devices made just prior to that instant and for determining the trend of the distribution curve over a relatively short period of time so that corrections may be made before the distribution curve approaches a point where rejections occur.

Heretofore where devices were manufactured and tested, it has been necessary individually to test the devices and make a statistical analysis and chart a distribution curve. Since this a relatively slow and tedious operation, it was found desirable to make sample tests rather than slow up the operation of the manufacturing process. Therefore sample devices were selected at random from the production batch, as close to the manufacturing process as possible, and analyzed, the distribution curve studied and the fabricating process adjusted accordingly. Such tests, even thought made at frequent intervals from relatively large samples, never gave an instantaneous indication and always provided a record simply of what the production quality had been a substantial time before.

Sometimes the only method for determining that the fabricating machine or process was producing devices which were not distributed properly along the curve was by information given by the test operator that "too many" of the devices exceeded or were below specification. Thereupon the machine was slowed up, adjustments were made, and the devices carefully tested until the proper distribution was obtained.

By the utilization of my novel system and apparatus, instantaneous indications are given continuously of the distribution of the devices along the curve for a particular characteristic. Not only will my novel system and apparatus provide such an instantaneous indication but it will also indicate the trend. Thus, even though the distribution curve may at any instant become unbalanced, watching the change in the curve over a short period will make possible the determination whether the distribution is correcting itself or whether the apparatus requires adjustment and correction.

A further object of my invention therefore is a provision of a system and apparatus for determining the distribution of devices along the curve for a particular characteristic, which system and apparatus will avoid the necessity for complex tedious and production-delaying statistical analysis.

The foregoing and many other objects of my invention will become apparent from the following description and drawings in which Figure 1 is a front view of the indicator operated by the novel system and apparatus of my invention for showing at any instant the distribution of a predetermined number of devices made just prior to that instant over a curve for a particular characteristic.

Figure 2 is a side view of the operating drum of my novel system and apparatus, which drum regulates the number of devices shown at any instant on the distribution curve of Figure 1 by subtracting from the curve of Figure 1 continuously as devices are added thereto, devices which at any instant fall outside the predetermined number.

Figure 3:
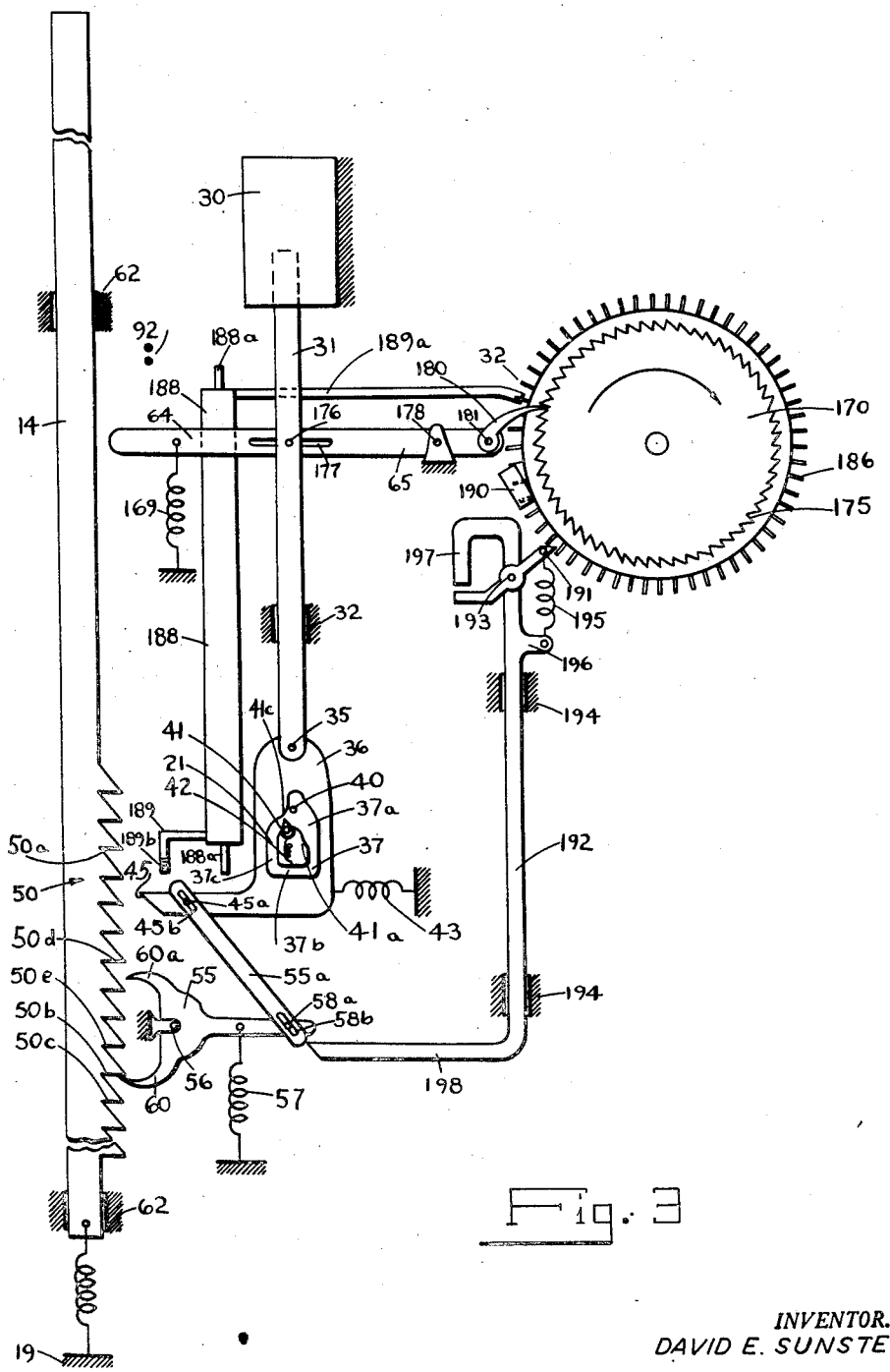
Figure 3 is a side view of a portion of the apparatus of Figures 1 and 2 showing the specific means by which the individual indicating elements of Figure 1 may be operated into position.

Generally, in order to indicate automatically the distribution of a given characteristic of a product, my novel method includes the following steps:

The device is tested unit by unit by a suitable means commensurate with the particular product and the characteristic for which the test is made. Each unit test is such as to give information classifying the particular unit under test into one of a plurality of groups, each group representing numerical differences of quality of the product. The information so obtained is used to actuate a multiplicity of counters, one counter for each group. The particular counter corresponding to the particular group into which a particular component falls is advanced one unit for every device under test which shows by the test that it falls into the group represented by the particular counter.

The information obtained from the test which feeds the group of counters is also supplied to a group of storage devices, which indicate the particular sequence of groups into which the characteristics of the tested device falls. Whenever a given counter is actuated by a component under test falling into the particular group for that counter, a particular storage element is simultaneously actuated. The storage elements function so that any given actuation therefor is retained for a predetermined number of successive tests after the given test. The storage system supplies to the apparatus a means indicating that the given test classified the device under test into a predetermined group. This storage element is subsequently used to subtract one unit from the counter reading previously obtained for that group at the end of the predetermined number of intervening tests.

Thus as the devices are tested a given counter will be advanced one unit if the device under test falls into a category represented by that counter; and after a predetermined number of successive tests that same counter will have whatever count is then indicated thereby reduced by one unit. In this manner the counters will indicate the distribution curve of the predetermined number of devices last tested and this indication of a distribution curve will always be maintained up to date or rather up to the particular instant.

Referring now to Figure 1, the indicating device comprises a housing 10 having an opening 11 in which indicating counters 12, 13, 14, 15, 16, 17, 18 and 19 are visible. The indicating counters 12—19 comprise a plurality of vertically movable rods (or appropriately colored extensions of vertically movable rods), the said rods or counters moving in front of a vertical scale card 21. The indicating device 10 and its scale card 21 are shown arranged for the graphical and instantaneous analysis and indication of the distribution curve of the quality or value of 80 units.

As previously pointed out, when the value of the 81st unit is at any instant added to the indicating device so as to elevate one of the counters 12—19 by one step, the first of the prior 80 indications stored in the indicating device is subtracted. Thus, for instance, if the units being tested are resistors, and if at any instant the first of the 80 resistors graphically shown was one which had a test value of 96 ohms and if at that instant the 81st resistor has a test value of 100 ohms, then the counter 15 for 100 ohms is raised one step and the counter 14 for 96 ohms is simultaneously lowered one step.

If in the foregoing example the first and the 81st resistor each tested at 100 ohms, the counter 15 remains stationary. Therefore the indicating device of Figure 1 continuously shows at any instant the quality of the last 80 devices manufactured. The scale card 21 is here calibrated for resistors which are to have an ohmic value of 100 and the various other values along which the distribution curve is plotted are given groups of plus or minus 2 ohms.

The type of distribution curve shown in Figure 1 demonstrates that the distribution is approximately correct at the particular instant shown with a fairly even substantially bell-shaped curve and a low number of resistors testing at extreme values. The distribution curve shown in Figure 1, however, gives an indication of a trend toward a higher value. This is so because counter 17 for 108 ohms is shown slightly higher than counter 13 for 92 ohms, counter 18 is shown at a higher level than counter 12, and counter 16 is shown at a higher level than counter 14. Should the curve shift slightly so that any of the counters 16, 17, 18 and 19 rise a step and any of the counters 12 to 15 drop a step, that will be an instantaneous indication that the trend of the distribution curve is toward excessive resistance and immediate correction should be made to restore the distribution curve to balance.

For various testing purposes, different optimum curves may be preferred and the scale card 21 may have a standard distribution curve 25 printed or drawn thereon so that the operator will obtain an immediate indication of variation in the distribution curve.

It will be obvious that so long as counter 15 extends above the standard curve 25 and all the other counters below the standard curve 25, that a curve which is even better than the standard distribution curve is obtained and relatively little adjustment need be made unless a trend appears showing a possibility of an abnormal number of resistors having too high or too low an ohmic value.

The condition of the indicator of Figure 1 will obtain only when the indicator has not been watched for a few moments since the fact that counters 16, 17 and 18 are above the optimum curve 25 provides an indication of a trend toward too high an ohmic value. Correction will ordinarily have been made of the apparatus before the positions of counters 16, 17 and 18 of Figure 1 will have been reached.

The counters 12 to 19 extend below the viewing portion 11 of the indicator 10 into a housing wherein the apparatus shown in Figures 2 and 3 is contained for actuation of the counters in accordance with received test information.

In Figure 3 I have shown the actuating means individual to one of the counters.

The apparatus hereinafter described in connection with Figure 4 may be utilized selectively to operate the particular actuating means for individual counters in accordance with the individual characteristics of the particular device passing through the test.

When, for instance, a particular resistor having an ohmic value of 96 ohms passes through the analysis device, it will energize the solenoid 30 (Figure 3) for counter 14 to attract and raise the rod 31 which slides in guide 32. Rod 31 is pivotally connected by pin 35 to the cam member 36 having the recessed guide 37. A stationary pin 40 enters recessed guide 37 of cam 36 and predetermines the motion of cam 36 as it is drawn up by rod 31 and then is permitted to drop once more.

As cam 36 rises, pin 40 is guided by latch 41 (on member 36), spring biased by spring 42 to the position shown, to enter section 37a of the recess 37. Latch 41 cooperates with the recess 41a in section 37a and the bulge 41c in section 37c of the recess to ensure the entry of pin 40 into section 37a. The cam 36 thus pivots clockwise on pin 35 against the tension of its restoring spring 43 to drive pawl 45, which is an extension of cam 36, against the teeth 50 at the lower end of rod 14.

Pawl 45 now driven into engagement with teeth 50 will, as member 36 continues to rise, pull up the tooth 50a which it engages and hence will push up rod 14. This raising movement of rod 14 is limited to one step on scale 21 of Figure 1 by appropriate adjustment of the travel of rod 31 with respect to solenoid 30 and by engagement of pin 40 at the bottom 37b of recess 37.

Escapement latch 55 is pivotally mounted at 56 and is spring biased by tension spring 57 engaging arm 58 to a position where its lower pawl member 60 supports rod 14 in the particular position to which it is raised.

When rod 14 is raised by pawl 45 engaging tooth 50a, tooth 50b is drawn away from pawl member 60. At the same moment, pin 45a on pawl 45 and pin 58a on arm 58 of escapement 55 reach the ends of their permitted travel in slots 45b and 58b, respectively, of link 55a, and lower pawl 60 of escapement 55 is withdrawn from tooth 50b of rod 14, spring 57 being tensed.

Recess 37 of cam 36 then is raised to the point where pin 40 has moved down portion 37a of recess 37 to portion 37b. Tension spring 43 may now pull cam 36 counterclockwise about its pivot 35 to pull pawl 45 out of engagement with tooth 50a. As pawl 45 moves to the right, but before it disengages the teeth of rack 50, spring 57 is permitted, by the motion of link 55, to pull lower pawl 60 into engagement with tooth 50c.

At this time rod 14 has thus been raised one step and is held in the new position by reason of the fact that pawl 60 has been moved from beneath tooth 50b to beneath tooth 50c.

On de-energization of the solenoid 30, rod 31 drops and cam 36 moves down so that its recess portion 37c moves down with respect to stationary pin 40, pin 40 moves past the bulge 41c and latch 41 moving it aside to do so, and the elements are restored to the position shown in Figure 3.

Appropriate additional mechanism may be added, such as guides 62 for rod 14, contacts 62 which are operated (as hereinafter described) by the end 64 of arm 65 to de-energize solenoid 30 at the end of the upward stroke, and an appropriate storage device for subtracting the first of a predetermined number of indications as a new one is added.

It is obvious that the apparatus herein described for rod 14 is duplicated for each of rods 12, 13, 15, 16, 17, 18 and 19. The particular solenoid 30 for the particular rod is energized in accordance with the test characteristics of the device under test, the apparatus of Figure 4 selecting the particular solenoid to be energized.

The test indicia storage device above referred to comprises the drum 170 (Figures 2 and 3) which extends across all of the rods. Drum 170 is freely rotatable in its bearings 171 and 172 and comprises a series of racks 175 each individual to a particular rod and a series of test indicia storing wheels 185 each of which is also individual to a specific rod 12—19.

When the rod 31 (which operates indicating rod or counter 14 of Figure 3) is raised, the pin 176 carried thereby which engages slot 177 of arm 65 raises end 64 of the arm 65 about the pivot 178 against the tension of spring 169. This depresses the opposite end of arm 65 carrying the pawl 180. Pawl 180 is substantially free for counterclockwise movement about its pivot 181, being restrained preferably only by the action of a small spring omitted from the drawing for clarity. Pawl 180 engages the particular rack 175 arranged for cooperation with the operating elements for rod 14.

When the end of arm 65 carrying pawl 180 is depressed by raising rod 31, pawl 180 rides down the chamfered surface of the tooth on rack 175 which it engages and enters beneath that tooth. When arm 65 is then restored to the original position of Figure 3, the pawl 180 raises the particular tooth of the rack 175 which it engages and thus rotates the entire drum 170 one step.

Whenever any similar operation occurs with respect to any of the indicating rods 12—19, drum 170 is thus rotated one step.

The indicia storing wheels 185 each have a plurality of pins 186 projecting radially therefrom. Each of the pins 186 is mounted in an individual slot 187 for movement parallel to the axis of drum 170 within the limits determined by the length of slot 187.

Where the test and analysis device is to distribute the quality or value of eighty devices along a curve for a particular characteristic, then each of the eight wheels 185 on drum 170 will have more than eighty pins 186 (depending on the re-setting distance for plate 190 hereinafter described).

A crank lever 188, pivoted at 188a, is arranged so that the tapered face 189b of one arm 189 is struck and moved aside by pawl 45 when cam 36 is raised; its other arm 189a is then moved into engagement with a specific pin 186, the end of arm 189a being curved to move the pin to the right (with respect to Figure 2). This occurs on the up-stroke of rod 31, and a spring, not shown, returns lever 188 to its initial position as pawl 45 drops and before drum 170 moves.

Thus, every time the drum 170 is rotated by pawl 180 of the mechanism for rod 14, a pin 186 on wheel 185 for that rod at a specific angular position is pushed over to the right.

When the drum 170 is rotated by the mechanism for say, rod 15, then the pin 186 on the wheel 185 for that particular rod is pushed over to the right; while all the other pins (on the other wheels) axially aligned with the pin which is pushed over, remain in their original left hand position.

Thus, at every test the whole drum is rotated one step by the operation which advances a particular rod 12—19; but only a pin 186 on the wheel 185 for the particular rod advanced will be pushed over, the other pins on other wheels along that line being unaffected.

Thus, for any angular section of the drum 170, only one of the eight pins 186 along that section will be pushed to the right.

The drum is so made that the distance clockwise around the drum 170 (Figure 3) between the end of arm 189a and pawl 191 is eighty radial pins.

Accordingly, an indication is stored up by actuation of member 188 and its arm 189a for a particular rod and moving over of a pin 186 on the up-stroke of draw bar 31; whereas on the downstroke thereof an indication is subtracted by actuation of pawl 191 by the eighty-first pin clockwise from pawl 180.

Each of the rods 12—19 has a pawl 191 and associated mechanism for lowering the rod one step. Each pawl 191 is so located that it can only be acted on by a pin 186 which has been pushed to the right by lever 189a.

When a pin 186 engages pawl 191, it raises the end thereof. Pawl 191 is pivotally mounted at 193 on rod 192 which is vertically slidable in guides 194. The engaged end of pawl 191 is connected by tension spring 195 to lug 196 on rod 192. Stop 197 on rod 192 limits clockwise rotation of pawl 191 in response to spring 195 and appropriately positions pawl 191 for engagement by a pushed-over pin 186.

As the pin 186, which has been pushed over, raises the end of pawl 191, it raises rod 192 since spring 195 has a tension greater than the force exerted by the weight of rod 192 and by spring 57. Rod 192 has an arm 198 extending out beneath arm 58 of the escapement 55. Raising arm 192 raises pawl 198 to raise arm 58 and rotate pawl 60 out of engagement with tooth 50b. Rod 14 drops slightly but is held since pawl 60a of escapement 55 moves under tooth 50d. The drop of rod 14 is at this time, however, sufficient to cause the edge of tooth 50b to clear the end of pawl 60 of the escapement.

The pin 186 now moves past pawl 191 by extending spring 195. Rod 192 now drops, moving pawl 198 away from arm 58; and spring 57 restores escapement 55 to the position of Figure 3. Pawl 60a is withdrawn from under tooth 50d and pawl 60 enters beneath tooth 50e, and the rod 14 is thus stepped down one step.

The pin 186 which has actuated pawl 191 is now, in the course of its travel toward lever 189a, pushed back toward the left or non-storage position by the curved stationary plate 190; and is restored just prior to possible future actuation by lever 189a.

It will thus be seen that a re-setting or stepback operation for a rod takes place during the release stroke of the solenoid 30, whereas the advancing or raising operation of the rod occurs during the operating stroke. Accordingly where the first of the series of eighty devices tested had actuated rod 14 and the eighty-first happens to actuate rod 14, rod 14 remains in effect stationary, being raised on the up-stroke of member 31 and dropped back on the down stroke of member 31.

Thus, the actuation of any solenoid for any rod will, through lever 188 and its arm 189a, push over a pin 186 on the wheel 185 for that rod at a specific angular portion of drum 170. No other pin aligned with that pin will be pushed over. The next operation of a rod will push over a pin along the next line. At the completion of the predetermined number of actuations, the pin 186 which has first been pushed over will stroke its pawl 191 to step back the rod which was first actuated.

In operation, the device is cleared with all rods 12—19 at zero position and all pins 186 at the left. This is effected by an extra complete revolution of the storage drum either manually or by any well known means, as by an electromagnet corresponding to electromagnet 30 having only parts corresponding to the pawl and ratchet 180 and 175. The magnet may be provided with a self make and break circuit of the well known type to effect rapid energization and de-energization thereof.

As the drum is rotated and no new settings are effected, this will cause a subtraction of the total, indicated by rods 12—19, as can be seen in Figure 3 where levers such as 192 operated by storage pins will cause the escapement mechanism such as 55 to subtract from the total registered on their associated rods, a number just equal to the number of levers which have been shoved to the right hand position of their slots. Since this number is just equal to the total count on the rods, the rods will be returned to their bottom position. Simultaneously all values stored in the storage drum will be removed by virtue of displacement of the levers therein to the left hand end of their respective slots, as previously described. Thus, by this re-setting means it is possible to make new tests which are exclusive of all previous tests. This is particularly applicable when the number of samples to be tested is less than the number of units N for which the storage drum has been designed.

Successive testings thereafter will raise different rods as different characteristics are recorded and push over a pin 186 for the rod raised. At the completion of a predetermined number, say eighty tests, the eighty-first actuation of a rod will be accompanied or immediately followed by the stepping back of the rod actuated in the first test; the eighty-second actuation of a rod will be accompanied or followed by the stepping back of the rod actuated in the second test; and so on.

This will continue with the rods registering at any instant only the last eighty tests. Where the distribution curve is to analyze more or less than eighty tests, then the number of pins clockwise between pawl 180 and 191 will be regulated accordingly.

Figure 4:
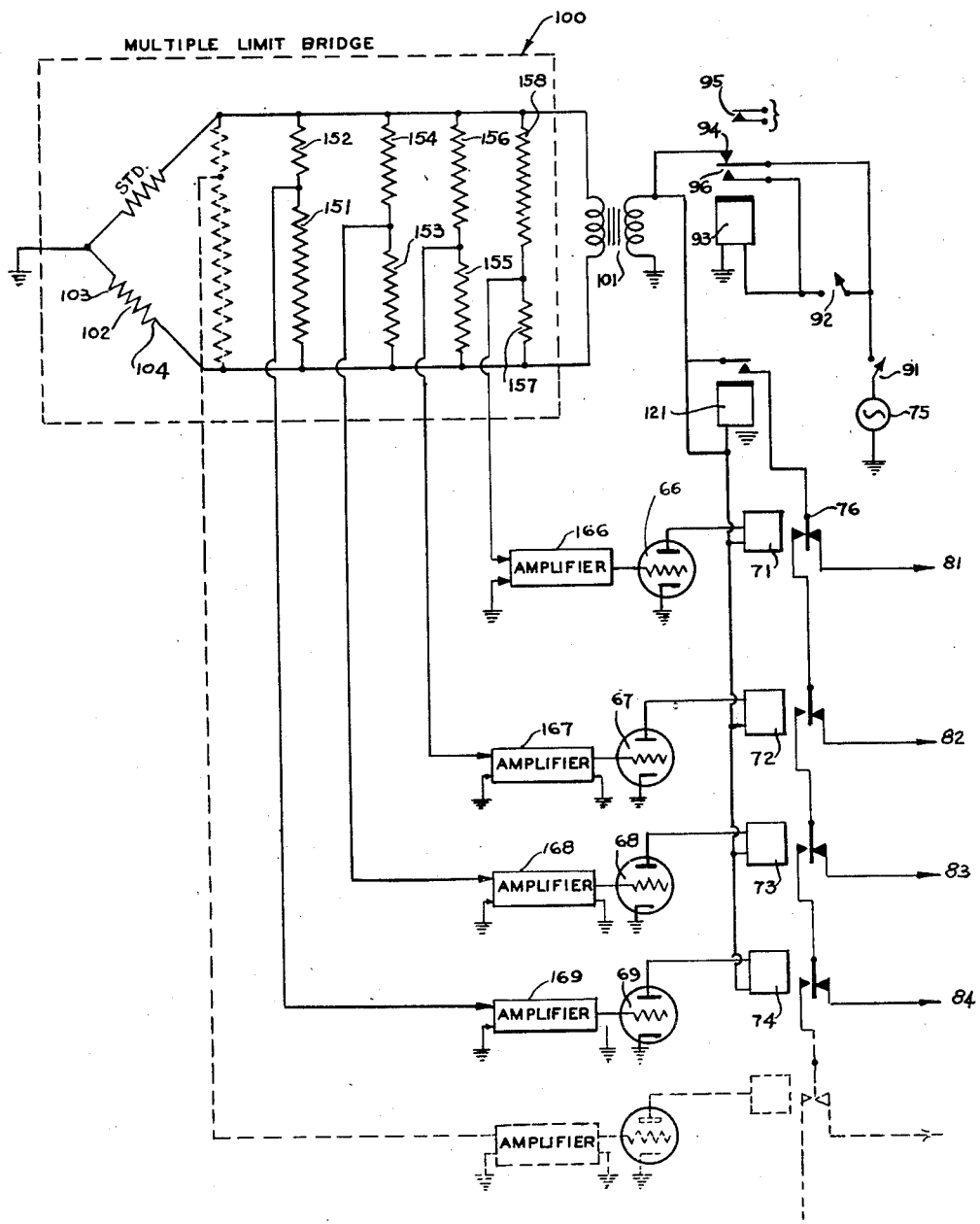
Figure 4 is a schematic view showing the association of the apparatus of Figures 1 to 3 with a resistance limit bridge for testing resistors for their distribution with respect to ohmic value.

Where, in addition to a current and instantaneous analysis of the last eighty (or other predetermined number) tests, a picture of all analyses is desired, card 21 may be a moving scale which may be completely displaced by another scale at every test, or every five or ten (or other number of tests) and rods 12—19 may carry record members to mark card 21 appropriately. This will give in effect a motion picture of the quality of an hour's or a day's production.

Where the devices to be tested comprise successive resistors, then the relationship of the rods shown in Figure 1 to a testing circuit through the mechanical system of Figure 3 is shown in Figure 4.

The apparatus shown in Figures 1–3 may, however, be readily used as a simple tabulating machine which may be manually operated. In this case each rod 31 for each of the counters 12—19 may be suitably operated by a button or key individual to each rod, suitably arranged to draw rod 31 up when pressed and drop it when released. Or solenoids 30 may each be individually operated by manual push-buttons to energize them when pressed, using a suitable relay if necessary to lock their respective circuits closed until rod 31 is raised and to open their respective circuits when rod 31 has completed its upward movement. The apparatus would then be useful for rapidly tabulating the results of tests which are now manually made, without the necessity for changing existing test apparatus. The manual tabulating apparatus will also be of value in some types of tests, particularly when production is small, which do not lend themselves to automatic procedures because of the relative costs.

In Figure 4 circuit 100, enclosed by the dotted line, is a multiple limit bridge which has been shown as a bridge for testing an unknown resistor. Various ratio arms of the multiple limit bridge for various limits are indicated.

Thus, the pair of resistors 151 and 152 form one limit test; the pair of resistors 153, 154 form another limit test; 155, 156 a third limit test; 157, 158 a fourth limit test, etc. This bridge is energized through a transformer 101 which is in turn energized from a source of alternating current 75.

When the resistor 102 having unknown characteristics is in position to be tested between test contacts 103 and 104, switch 91 is closed. This completes an energizing circuit through back relay contact 94 to the primary of transformer 101 for the multiple limit bridge 100. Simultaneously it energizes the plate circuit of the vacuum tube phase detectors 66, 67, 68 and 69 over a circuit including individual relays 71 to 74.

One of the outposts of the multiple limit bridge is fed into amplifier 166. If the unknown is of higher value than the limit set by the pair of resistors associated in the multiple limit bridge with amplifier 166, then tube 66 will be energized, which in turn will energize relay coil 71. This will operate relay contact 76 which will disconnect line 81, and connect the contact 76 onto the relay contact associated with coil 72. Relay contact 76 is fed from the contacts associated with slow acting relay 121. This relay is energized as soon as the system is energized, but is slow in acting and does not close until all of the relay contacts 76 are in their appropriate position; that is, the position dictated by the actual value of the unknown resistance. Then the relay contacts associated with relay 121 are closed and energy is fed out over the appropriate line 81, 82, 83 or 84, etc. to activate the solenoid 30 (Figure 3) which is connected to the appropriate rod.

Assume, for example, that the unknown is higher in value than the limit set by the combination of resistors set by 153 and 154 but is lower in value than the combination set by 151 and 152. Under these circumstances, phase detectors 66, 67 and 68 will all be energized, and consequently relays 71, 72 and 73 will be energized. However, relay 74 will be unoperated, as will all relays therebelow, indicated by the dotted circuits. As a result of this, lines 81, 82 and 83 will be disconnected, but line 84 will be connected through the relay sequence and through relay 121 to the source of power.

This line 84 is connected to the solenoid corresponding to solenoid 30 in Figure 3, and this coil is associated with the rod in Figure 1 which corresponds to the resistance between the limit given by resistors 153 and 154, and the limit given by the resistors 151 and 152. Thus, these two sets of resistors establish the edge or edges of the range of the associated rod in Figure 1; that is, the rod which is associated through the mechanism of Figure 3 to line 84 in Figure 4.

When the rod corresponding to rod 14 of Figure 3 has risen to its full travel, contactor 92 (Figure 3) is closed. This contactor 92 is also shown in Figure 4, and it applies power to relay coil 93 which is also a slow acting coil.

When this relay acts, relay contact 96 is pulled down to close its front contact to lock the relay, and back contact 94 is opened. This disconnects the limit bridge and consequently releases the solenoid 30, thereby opening contactor 92. At the same time, relay contacts 95 are closed. These contacts may initiate the unit advancing mechanism (not shown) which removes the resistor 102 which has been tested and advances the next unit to be tested in the test position. As the resistor which has been tested moves out of the test position, the mechanism causing such motion opens contacts 91, which in turn releases relay 93, which also in turn opens contact 95. However, this is satisfactory since contact 95 only needed to be contacted momentarily to start the changing of resistors. After this process has started, the operation may continue without maintaining the closure of contacts 95.

With contacts 91 opened, all relays return to their unenergized condition ready to start another test as soon as the new resistor to be tested has moved into position into the testing mechanism. The resistance limits set for the individual rods, shown in Figure 1, are established as has been seen by the values of the resistances used in the multiple limit bridge.

In order to obtain eight ranges as was shown in Figure 1, it is desirable to use in the multiple limit bridge nine different limit positions, that is, nine pairs of resistors, each pair of which establishes a definite tolerance limit. Likewise, it is desirable to use nine amplifiers, nine phase sensitive detectors, nine associated relays.

Under these circumstances, line 81 may be arranged so that it would not go to a solenoid which would operate a rod. Instead, it may be connected to operate an alarm system or indicating mechanism which would indicate that a resistor had been tested which fell completely outside of the range indicated on the horizontal scale of Figure 1.

Likewise the line, which would lead from the closed position of the lowest amplifier on the scale, would also indicate a resistor which was outside of the limit set on the scale of Figure 1. If it was felt desirable to do so, it could be so arranged that all of these outside limits could be recorded on Figure 1. This could be done by making the lowest range not 88 ohms (±2) but zero to 90 ohms; and the highest range not 116 ohms (±2) but 116 ohms or greater. Under these circumstances, seven sets of resistors may be employed in the multiple limit bridge, along with seven amplifiers, seven phase sensitive detectors and seven relays. The choice of which of these schemes will be used will, of course, depend upon the particular circumstances associated with the tests which are to be made.

It now can be seen that this invention allows the multiple unit limit test bridge to be applied to a system of relays which will operate a mechanical system in such a manner that the result of these tests is shown in a graphical form.

Furthermore, as has been shown, this mechanical mechanism can be so arranged as to store the result of test for a prescribed number of tests, and to then substract the result of the test after a certain number of tests has gone by. In this manner the data shown on the indicator graph is the data for the last set of tests which have been made, and this data is continuous.

Summarizing the above, means are provided for obtaining a distribution curve of the quality of the manufactured product by automatic means. In substance, the quality measure of the manufactured product is divided into a series of groups. Thus, if 100 represents the desired quality value, the groups might range from 100 to 110, from 110 to 120, from 100 down to 90, from 90 down to 80, and so on each side of the normal value of 100. For each of these quality ranges there is associated an indicator rod. This indicator rod is raised to a level which corresponds to the number of units manufactured within a certain period of time which fell within this tolerance range. The entire series of such rods associated with the entire series of tolerance ranges, then provides a visual indication of the distribution curve of the manufacturing process over the last given number of articles manufactured.

In the above I have described a system for instantaneously producing a distribution curve derived from test results as they are being made. It will be obvious that there are many modifications my invention may assume and I do not wish to be limited by the specification embodiment I have chosen for illustrating my invention, but only by the appended claims.

I claim:

1. In a system for production control, means for testing devices being manufactured for a predetermined characteristic and for classifying each of said devices tested into one of a plurality of groups, each group representing numerical differences of the tested characteristics of the devices, a distribution curve producing mechanism, a storage mechanism for indicating the particular sequence of groups into which the characteristics of the tested device falls, means for operating both said mechanisms under control of said testing means, and means controlled by said storage mechanism and operative after a predetermined number of tests have been made for deleting from said curve producing mechanism the portion of the curve produced by the earliest reading affecting the curve.

2. In a system for production control, means for testing a plurality of devices for a predetermined characteristic and for classifying each of said devices tested into one of a plurality of groups, each group representing numerical differences of the tested characteristics of the devices, counter mechanism individual to each group and selectively operated in accordance with the group into which the device tested falls, and means responsive to said first mentioned tests and operative after a predetermined number of tests have been made for deleting from the counter mechanism the reading thereon effected by the earliest reading.

3. In a system for production control, means for testing a plurality of devices for a predetermined characteristic, and for classifying each of said devices tested into one of a plurality of groups, each group representing numerical differences of the tested characteristics of the devices, counter mechanism individual to each group and selectively operated in accordance with the group into which the device tested falls, and means operative after a predetermined number of tests have been made for deleting from the counter mechanism the reading thereon effected by the earliest reading, said means comprising a storage mechanism operated in response to said first tests in accordance with the group into which the characteristics of the tested device falls and in accordance with the sequence position of the tested device with respect to other tested devices.

4. In a system for production control, means for testing a plurality of devices for a predetermined characteristic and for classifying each of said devices tested into one of a plurality of groups, each group representing numerical differences of the tested characteristics of the devices, counter mechanism individual to each group and selectively operated in accordance with the group into which the device tested falls, said counter mechanism when operated forming a curve showing the distribution of the characteristics of the devices tested, and means initiated by said first mentioned test and operative after a predetermined number of tests have been made for deleting from the counter mechanism the reading thereon effected by the earliest reading.

5. In a system for production control, means for testing a plurality of devices for a predetermined characteristic and for classifying each of said devices tested into one of a plurality of groups, each group representing numerical differences of the tested characteristics of the devices, counter mechanism individual to each group and selectively operated in accordance with the group into which the device tested falls, said counter mechanism when operated forming a curve showing the distribution of the characteristics of a predetermined number of devices tested, and means operative after a predetermined number of tests have been made for deleting from the counter mechanism the reading thereon effected by the earliest reading, said means comprising a storage mechanism operated in accordance with the group into which the characteristic of the tested device falls and in accordance with the sequence position of the tested device with respect to other devices.

6. In a device for testing units to give information classifying the particular unit under test into one of a plurality of groups, each group representing numerical differences of quality of the product, a group of storage devices, each group being individual to one of said classification groups, and each group of storage devices comprising a predetermined number of storage elements, and means responsive to a test of a unit for operating one of said storage elements in one of said groups, the particular storage element operated being determined in accordance with the particular sequence of said tested unit with respect to other tested units and the particular group being in accordance with the classification into which said tested unit falls, and means controlled by said storage devices for restoring said test responsive means at the end of a predetermined number of intervening tests.

7. In a device for testing units to give information classifying the particular unit under test into one of a plurality of groups, each group representing numerical differences of quality of the product, a group of storage devices, each group being individual to one of said classification groups and each group of storage devices comprising a predetermined number of storage elements, means responsive to a test of a unit for operating one of said storage elements in one of said groups, the particular storage element operated being determined in accordance with the particular sequence of said tested unit with respect to other tested units and the particular group being in accordance with the classification into which said tested unit falls, a plurality of counters, each counter being individual to one of said classifying groups, and means responsive to a test and to a storage element for operating a particular counter corresponding to the particular group into which said tested unit falls, to indicate on said counter the number of units falling in said particular group.

8. In a device for testing units to give information classifying the particular unit under test into one of a plurality of groups, each group representing numerical differences of quality of the product, a group of storage devices, each group being individual to one of said classification groups and each group of storage devices comprising a predetermined number of storage elements, means responsive to a test of a unit for operating one of said storage elements in one of said groups, the particular storage element operated being determined in accordance with the particular sequence of said tested unit with respect to other tested units and the particular group being in accordance with the classification into which said tested unit falls, a plurality of counters, each counter being individual to one of said classifying groups, means responsive to a test for operating a particular counter corresponding to the particular group into which said tested unit falls, and means controlled by said storage device for subtracting one unit from said counter reading previously obtained for that group at the end of a predetermined number of intervening tests.

DAVID E. SUNSTEIN.

REFERENCES CITED

The following references are of record in the file of this patent:

UNITED STATES PATENTS

| Number | Name | Date |
|---|---|---|
| 2,006,999 | Nachumsohn | July 2, 1935 |
| 2,168,443 | Johnson | Aug. 8, 1939 |
| 2,343,240 | Molins | Mar. 7, 1944 |
| 2,398,987 | Zeibolz | Apr. 23, 1946 |
| 2,398,988 | Zeibolz | Apr. 23, 1946 |